3,150,705
INFLATABLE TIRES
Francis Mark Geraghty, 141 Ruislip Road E.,
Hanwell, London, England
Filed Nov. 7, 1962, Ser. No. 236,056
3 Claims. (Cl. 152—426)

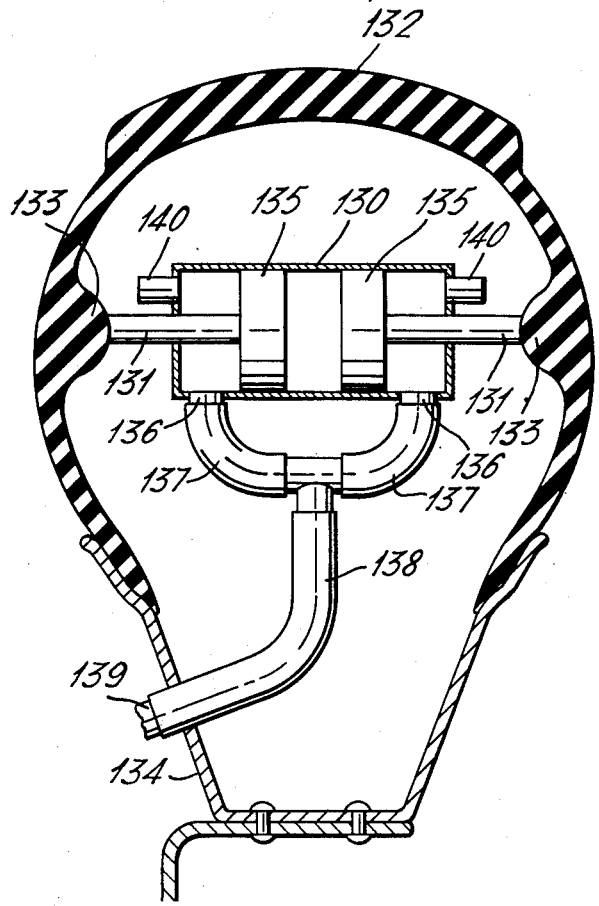

The invention relates to inflatable tires and particularly to means for indicating that the pressure in a pneumatic tire is below a predetermined value and/or for maintaining the pressure in a pneumatic tire at a predetermined value.

According to a further feature of the invention, means comprising a pump are provided, the means being so constructed that it may be mounted on a vehicle wheel provided with or adapted to receive an inflatable tire in such manner that the means is effective to pump air into the tire of the wheel when the wheel rotates, that is, when the vehicle is in movement, and the pressure in the tire is below a determined level.

More than one pump may be provided; for example, two pumps may be coupled together.

The lever or other actuating member may be operated by the in-and-out movement of the side wall of the tire as the vehicle travels over the road or other surface.

Alternatively, the lever or other actuating member may be operated by the up-and-down movement of the tire tread as the vehicle is in movement. The actuating member and the electrically or mechanically driven pump or pumps are then preferably mounted inside the tire on the wheel rim.

The means according to the invention enables the pressure in an underinflated tire to be automatically increased to the correct value when the vehicle is travelling.

One construction according to the invention is diagrammatically illustrated by way of example in the accompanying drawing in which FIGURE 1 is a cross view of one construction of inflating apparatus mounted on a vehicle wheel.

In the construction diagrammatically illustrated in the drawing, a pump 130 provided with two pistons 135 on piston rods 131 is mounted within a tire 132. The two pistons rods 131 pass through opposite ends of the pump 130 and the outer ends of the rods are secured on brackets or like members (not shown) moulded in or secured to the inner surface of the side walls of the tire.

A one-way outlet valve 140 is provided in each of the two end walls of the pump 130, and a one-way inlet valve 136 is provided at each end of the side wall of the pump. The valves 136 are connected through flexible lines 137 to a common flexible line 138 the other end of which communicates with the atmosphere through an inlet valve 139 provided in the wheel 134 on which the tire 132 is mounted.

When the tire 132 is underinflated and a vehicle on which the wheel 134 is mounted is travelling over the ground, the side walls of the tire will undergo a greater in-and-out movement than if the tire were correctly inflated. As the tire side walls bulge outwardly, the pistons 135 are pulled towards the end walls of the pump 130 and air contained between the pistons 135 and the said end walls is forced out of the pump through valves 140 and into the tire 132. As the wheel 134 continues to revolve and the pump 130 moves away from the road surface, the portions of the tire side walls to which the piston rods 131 are secured automatically move inwardly. The pistons 135 thus travel towards each other and air is drawn into both ends of the pump from the atmosphere through valves 136, lines 137 and 138 and valve 139. As the pump 130 again approaches the position in which it is closest to the road surface, the adjacent portions of the tire side walls again bulge outwardly, thereby moving the pistons 135 away from each other and again forcing air into the tire casing through the valves 140. This pumping of air into the tire casing continues as the vehicle continues to travel, until the pressure in the tire is increased above a predetermined value at which the in-and-out movement of the tire side walls is insufficient to effectively pump any further air into the casing.

It will be understood that, if necessary, means may be provided to assist in returning the pistons 135 on their suction stroke. Such means may, for example, comprise a tension spring secured to and mounted between the adjacent faces of the pistons 135 and/or a compression spring mounted between each end wall of the pump 130 and the adjacent face of the corresponding piston 135.

It will also be understood that two or more pumps 130 may be mounted in a tire.

I claim:
1. In a pump of the character described, the combination including, a vehicle wheel, an inflatable tire mounted thereon, pump means having at least one cylinder, and at least one piston rod contained within said tire, means for securing the cylinder to one sidewall of the tire, means for securing one end of the piston rod to the other sidewall whereby in-and-out movement of the sidewalls will impart positive reciprocatory actuation of said pump means, the outlet of the pump means being in communication with the interior of the tire, and conduit means for communication between the inlet of the pump means and the exterior of the tire.

2. The invention as defined in claim 1, wherein each of said means for securing the cylinder and said one end of the piston rod to the sidewalls of the tire includes a projecting element bonded to said respective sidewalls.

3. A pneumatic tire according to claim 1, in which the pump has two pistons each having its own rod, the outer end of the rod of one piston being mounted on one side wall of the tire and the outer end of the rod of the second piston being mounted on the other side wall of the tire.

References Cited in the file of this patent
UNITED STATES PATENTS

| | | |
|---|---|---|
| 535,505 | Moore | Mar. 12, 1895 |
| 715,094 | Langton | Dec. 2, 1902 |
| 897,811 | Barrie | Sept. 1, 1908 |
| 1,312,074 | Cumming | Aug. 5, 1919 |
| 1,664,970 | Cumming | Apr. 3, 1928 |
| 1,756,678 | Cumming | Apr. 29, 1930 |
| 2,626,650 | Gibbons et al. | Jan. 27, 1953 |
| 2,710,391 | Trinca | June 7, 1955 |
| 2,736,004 | Greene | Feb. 21, 1956 |